US008976161B2

(12) United States Patent
Mills et al.

(10) Patent No.: US 8,976,161 B2
(45) Date of Patent: Mar. 10, 2015

(54) SYSTEMS AND METHODS FOR IMAGE PROCESSING

(75) Inventors: Christopher L. Mills, Saratoga, CA (US); David Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 13/409,957

(22) Filed: Mar. 1, 2012

(65) Prior Publication Data

US 2013/0229395 A1    Sep. 5, 2013

(51) Int. Cl.
| G06F 3/038 | (2013.01) |
| G09G 5/00 | (2006.01) |
| H04N 5/367 | (2011.01) |
| H04N 9/04 | (2006.01) |

(52) U.S. Cl.
CPC ............. *H04N 9/045* (2013.01); *H04N 5/367* (2013.01); *H04N 5/3675* (2013.01)
USPC .......................................... 345/207; 345/204

(58) Field of Classification Search
CPC ................................. G06F 3/038; G09G 5/00
USPC ........... 345/204, 207; 348/246, 247; 382/162, 382/166
See application file for complete search history.

(56) References Cited

U.S. PATENT DOCUMENTS

| 7,362,894 | B2 | 4/2008 | Ono et al. |
| 7,460,688 | B2 | 12/2008 | Stanback et al. |
| 7,468,752 | B2 | 12/2008 | Kalevo |
| 2004/0032516 | A1 | 2/2004 | Kakarala |
| 2005/0088560 | A1* | 4/2005 | Kalevo .................... 348/333.01 |
| 2006/0139376 | A1 | 6/2006 | Le Dinh et al. |
| 2007/0248286 | A1 | 10/2007 | Li et al. |
| 2011/0090242 | A1 | 4/2011 | Cote et al. |
| 2011/0090371 | A1 | 4/2011 | Cote et al. |
| 2011/0157413 | A1 | 6/2011 | Yoshida |
| 2011/0261217 | A1 | 10/2011 | Muukki et al. |
| 2011/0317047 | A1 | 12/2011 | Stanhill |

FOREIGN PATENT DOCUMENTS

KR    10-2006-0065529 A    6/2006

OTHER PUBLICATIONS

Korean Office Action for Korean Application No. 2013-22846 dated Jan. 9, 2014; 5 pgs.
International Search Report and Written Opinion for PCT Application No. PCT/US2013/027657 dated Apr. 30, 2013; 11 pgs.

* cited by examiner

*Primary Examiner* — Ricardo L Osorio
(74) *Attorney, Agent, or Firm* — Fletcher Yoder PC

(57) ABSTRACT

The present disclosure relates generally systems and methods for image data processing. In certain embodiments, a method for transferring the image data may include processing the image data in an image sensor by correcting one or more defective pixels in the image data based on a one-dimensional defective pixel correction algorithm; horizontally demosaicing the image data based on a one-dimensional horizontal demosaic algorithm; or a combination thereof. After processing the image data, the method may include horizontally downscaling the processed image data in the image sensor and vertically downscaling the horizontally downscaled image data in an image signal processor to be displayed for viewing on a display device.

24 Claims, 9 Drawing Sheets

SYSTEMS AND METHODS FOR IMAGE PROCESSING

BACKGROUND

The present disclosure relates generally to image processing and, more particularly, to systems and methods for initial image processing in an image sensor before additional processing in an image signal processor.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Digital imaging devices have become increasing popular due, at least in part, to such devices becoming more and more affordable for the average consumer. Further, in addition to a number of stand-alone digital cameras currently available on the market, it is not uncommon for digital imaging devices to be integrated as part of another electronic device, such as a desktop or notebook computer, a cellular phone, or a portable media player.

To acquire image data, most digital imaging devices include an image sensor that provides a number of light-detecting elements (e.g., photodetectors) configured to convert light detected by the image sensor into an electrical signal. An image sensor may also include a color filter array that filters light captured by the image sensor to capture color information. The image data captured by the image sensor may then be sent to an image processing pipeline (e.g., image signal processor (ISP)), which may apply a number of various image processing operations to the image data and generate a full color image that may be displayed for viewing on a display device, such as a monitor. In general, the image sensor may send the image data to the ISP via a sensor-to-ISP data link. As such, for still image data, the image sensor captures an image and sends the image as raw image data to the ISP via the sensor-to-ISP data link. The ISP and the sensor-to-ISP data link may generally be able process the raw image data at a standard rate such that it will effectively display the high-resolution image on a display device.

Video image data, on the other hand, include a great deal more amount of data as compared to still image data. For instance, video images may include images captured at 30 to 60 frames per second (i.e., raw video data). Certain professional camera devices may process high-resolution raw video data in the ISP before downscaling the video data to a typical output resolution (e.g., 1920×1080). Processing each frame of the raw video data through the ISP, however, consumes significant processing and power resources. To avoid, many consumer camera devices may reduce the effective resolution of raw video data in the sensor before transferring the raw image data to the ISP.

A common way to reduce the effective resolution of the raw video data is by "binning" the raw video data. Binning may include averaging adjacent groups of same-color pixels in each frame of the raw image data to make an effective lower-resolution sensor. For example, on a 4000×3000 pixel sensor, the sensor may be programmed to bin each 2×2 group of pixels and reduce the effective resolution of the pixel sensor to 2000×1500, which the ISP might crop and/or scale to a resolution of 1920×1080. Although the ISP and the sensor-to-ISP data link may more efficiently process the high-resolution images and video images received by the image sensor using the binning process, the quality of resulting video images may be unsatisfactory.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to systems and method for transferring image data within an image processing system. In order to display high-resolution images and video images effectively, an image sensor may reduce the effective resolution of its raw image data. As used herein, the terms "raw video data" and "raw image data" both refer to image data captured by an image sensor during video capture. In this disclosure, these terms may be used substantially interchangeably. The sensor may send modified raw image data to an ISP via a sensor-to-ISP data link. The ISP and the sensor-to-ISP data link may process the modified image data to obtain a finished video viewable on a display device.

Instead of simply binning the raw image data in the image sensor, which could result in a loss of image information, the image sensor may horizontally downscale the raw video image data to reduce the bandwidth of the raw image data by a factor of two. Horizontal downscaling may be a relatively resource-efficient operation to perform in the sensor. The image sensor may then send the horizontally downscaled image data to the ISP via the sensor-to-ISP data link. Once the ISP receives the downscaled image data, the ISP may vertically downscale it to generate a final output resolution of the image, which may be displayed on a display device.

Additionally or alternatively, the image sensor may identify defective pixels from the raw image data before horizontally downscaling. In this manner, the image sensor may correct for defective pixels before downscaling the raw image data and before sending the downscaled image data to the ISP. Since defective pixels may be remedied before downscaling the video data, the defective pixels may have less impact on the quality of the ultimate video image data.

The image sensor may employ one-dimensional defective pixel correction to determine whether a respective pixel is defective. This one-dimensional defective pixel correction may use fewer resources than defective pixel correction of the type usually found in an ISP. Reviewing pixel data as it is output, line by line, the image sensor may determine whether neighboring pixels of the same color component differ by more than a threshold value. Since the defective pixel correction is generally one-dimensional—relying mainly on pixel data from the current scan line and not at all on future scan lines—the image sensor may compare a pixel to its left and right adjacent neighbors. If the difference between neighboring pixels is greater than this threshold value, the image sensor may flag the respective pixel as possibly being defective. The image sensor may then designate the flagged pixel as a defective pixel if none of the flagged pixel's immediately neighboring pixels (i.e., one pixel away in lateral and above directions) are flagged. After designating a pixel as a defective pixel, the image sensor may replace the value of the defective pixel using a linear filter and the pixel values from the defective pixel's neighboring pixels.

The image sensor may also, in some instances, perform a one-dimensional demosaic operation on the raw image data before horizontally downscaling the raw image. When demosaicing the raw image data, the image sensor may receive the raw image data as streams of pixels (i.e., rows of pixels) and output a stream of two-color pixel values such that each of the two-color pixel values may correspond to one of the pixels of the raw image data. The two-color pixel value may include an original pixel color value that corresponds to the color component of a respective pixel and an interpolated pixel color value that corresponds to a color component of the respective pixel's horizontally adjacent pixel. The stream of two-color pixel values created by the demosaicing operation may then be horizontally downscaled by the image sensor and sent to the ISP via the sensor-to-ISP data link. The demosaicing operation may enable the horizontally downscaled image data to retain some of the horizontal detail that may have been lost if the raw image data was horizontally downscaled without demosaicing.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As will be discussed below, the present disclosure relates generally to techniques for processing image data acquired via one or more image sensing devices. In particular, certain aspects of the present disclosure may relate to transferring image data to an image signal processor (ISP), detecting and correcting defective pixels in image data, and demosaicing image data. It should be understood that the presently disclosed techniques may be applied to both still images and moving images (e.g., video), and may be utilized in any suitable type of imaging application, such as a digital camera, an electronic device having an integrated digital camera, a security or video surveillance system, a medical imaging system, and so forth.

Figure 1:
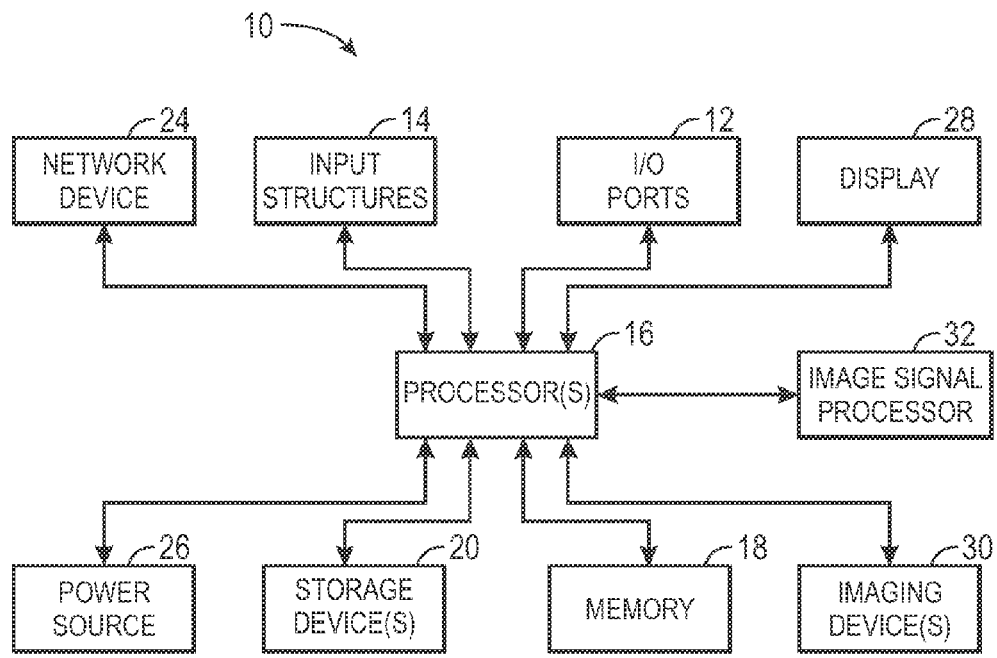
FIG. 1 is a simplified block diagram depicting components of an example of an electronic device that includes an imaging device and image processing circuitry configured to implement one or more of the image processing technique set forth in the present disclosure.

Keeping the above points in mind, FIG. 1 is a block diagram illustrating an example of an electronic device 10 that may provide for the processing of image data using one or more of the image processing techniques briefly mentioned above. The electronic device 10 may be any type of electronic device, such as a laptop or desktop computer, a mobile phone, a digital media player, or the like, that is configured to receive and process image data, such as data acquired using one or more image sensing components. By way of example, the electronic device 10 may be a portable electronic device, such as a model of an iPod®, iPad®, or iPhone®, available from Apple Inc. of Cupertino, Calif. Additionally, the electronic device 10 may be a desktop or laptop computer, such as a model of a MacBook®, MacBook® Pro, MacBook Air®, iMac®, Mac® Mini, or Mac Pro®, available from Apple Inc. In other embodiments, electronic device 10 may also be a model of an electronic device from another manufacturer that is capable of acquiring and processing image data.

Regardless of its form (e.g., portable or non-portable), it should be understood that the electronic device 10 may provide for the processing of image data using one or more of the image processing techniques briefly mentioned above. In some embodiments, the electronic device 10 may apply such image processing techniques to image data stored in a memory of the electronic device 10. In further embodiments, the electronic device 10 may include one or more imaging devices, such as an integrated or external digital camera, configured to acquire image data, which may then be processed by the electronic device 10. Embodiments showing both portable and non-portable embodiments of electronic device 10 will be further discussed below in FIGS. 3-6.

As shown in FIG. 1, the electronic device 10 may include various internal and/or external components, which contribute to the function of the device 10. Those of ordinary skill in the art will appreciate that the various functional blocks shown in FIG. 1 may comprise hardware elements (including circuitry), software elements (including computer code stored on a computer-readable medium) or a combination of both hardware and software elements. For example, in the presently illustrated embodiment, the electronic device 10 may include input/output (I/O) ports 12, input structures 14, one or more processors 16, memory device 18, non-volatile storage 20, networking device 24, power source 26, and display 28. Additionally, the electronic device 10 may include one or more imaging devices 30, such as a digital camera, and an image signal processor (ISP) 32. As can be appreciated, image signal processor 32 may process image data that may be retrieved from the memory 18 and/or the non-volatile storage device(s) 20, or may be acquired using the imaging device 30.

Before continuing, it should be understood that the system block diagram of the device 10 shown in FIG. 1 is intended to be a high-level control diagram depicting various components that may be included in such a device 10. That is, the connection lines between each individual component shown in FIG. 1 may not necessarily represent paths or directions through which data flows or is transmitted between various components of the device 10. Indeed, as discussed below, the depicted processor(s) 16 may, in some embodiments, include multiple processors, such as a main processor (e.g., CPU), and dedicated image and/or video processors.

With regard to each of the illustrated components in FIG. 1, the I/O ports 12 may include ports configured to connect to a variety of external devices, such as a power source, an audio output device (e.g., headset or headphones), or other electronic devices (such as handheld devices and/or computers, printers, projectors, external displays, modems, docking stations, and so forth). In one embodiment, the I/O ports 12 may be configured to connect to an external imaging device, such as a digital camera, for the acquisition of image data that may be processed using the image signal processor 32. The I/O ports 12 may support any suitable interface type, such as a universal serial bus (USB) port, a serial connection port, an IEEE-1394 (FireWire) port, an Ethernet or modem port, and/or an AC/DC power connection port.

The input structures 14 may provide user input or feedback to the processor(s) 16. For instance, input structures 14 may be configured to control one or more functions of electronic device 10, such as applications running on electronic device 10. By way of example, input structures 14 may include buttons, sliders, switches, control pads, keys, knobs, scroll wheels, keyboards, mice, touchpads, and so forth, or some combination thereof. In one embodiment, input structures 14 may allow a user to navigate a graphical user interface (GUI) displayed on device 10. Additionally, input structures 14 may include a touch sensitive mechanism provided in conjunction with display 28. In such embodiments, a user may select or interact with displayed interface elements via the touch sensitive mechanism.

The input structures 14 may include the various devices, circuitry, and pathways by which user input or feedback is provided to one or more processors 16. Such input structures 14 may be configured to control a function of the device 10, applications running on the device 10, and/or any interfaces or devices connected to or used by the electronic device 10. For example, the input structures 14 may allow a user to navigate a displayed user interface or application interface.

In certain embodiments, an input structure 14 and the display device 28 may be provided together, such as in the case of a "touchscreen," whereby a touch-sensitive mechanism is provided in conjunction with the display 28. In such embodiments, the user may select or interact with displayed interface elements via the touch-sensitive mechanism. In this way, the displayed interface may provide interactive functionality, allowing a user to navigate the displayed interface by touching the display 28.

In one embodiment, the input structures 14 may include an audio input device. For instance, one or more audio captures devices, such as one or more microphones, may be provided with the electronic device 10. The audio capture devices may be integrated with the electronic device 10 or may be an external device coupled to the electronic device 10, such as by way of the I/O ports 12. The electronic device 10 may both an audio input device and imaging device 30 to capture sound and image data (e.g., video data), and may include logic configured to provide for synchronization of the captured video and audio data.

In addition to processing various input signals received via the input structure(s) 14, the processor(s) 16 may control the general operation of the device 10. For instance, the processor(s) 16 may provide the processing capability to execute an operating system, programs, user and application interfaces, and any other functions of the electronic device 10. The processor(s) 16 may include one or more microprocessors, such as one or more "general-purpose" microprocessors, one or more special-purpose microprocessors and/or application-specific microprocessors (ASICs), or a combination of such processing components. For example, the processor(s) 16 may include one or more instruction set (e.g., RISC) processors, as well as graphics processors (GPU), video processors, audio processors and/or related chip sets. As will be appreciated, the processor(s) 16 may be coupled to one or more data buses for transferring data and instructions between various components of the device 10. In certain embodiments, the processor(s) 16 may provide the processing capability to execute an imaging applications on the electronic device 10, such as Photo Booth®, Aperture®, iPhoto®, or Preview®, available from Apple Inc., or the "Camera" and/or "Photo" applications provided by Apple Inc. and available on models of the iPhone® or iPad®.

The instructions or data to be processed by the processor(s) 16 may be stored in a computer-readable medium, such as a memory device 18. The memory device 18 may be provided as a volatile memory, such as random access memory (RAM) or as a non-volatile memory, such as read-only memory (ROM), or as a combination of one or more RAM and ROM devices. The memory 18 may store a variety of information and may be used for various purposes. For example, the memory 18 may store firmware for the electronic device 10, such as a basic input/output system (BIOS), an operating system, various programs, applications, or any other routines that may be executed on the electronic device 10, including user interface functions, processor functions, and so forth. In addition, the memory 18 may be used for buffering or caching during operation of the electronic device 10. For instance, in one embodiment, the memory 18 include one or more frame buffers for buffering video data as it is being output to the display 28.

In addition to the memory device 18, the electronic device 10 may further include a non-volatile storage 20 for persistent storage of data and/or instructions. The non-volatile storage 20 may include flash memory, a hard drive, or any other optical, magnetic, and/or solid-state storage media, or some combination thereof. In accordance with aspects of the present disclosure, image data stored in the non-volatile storage 20 and/or the memory device 18 may be processed by the image signal processor 32 before being output on a display.

The electronic device 10 also includes the network device 24, which may be a network controller or a network interface card (NIC) that may provide for network connectivity over a wireless 802.11 standard or any other suitable networking standard, such as a local area network (LAN), a wide area network (WAN), an Enhanced Data Rates for GSM Evolution (EDGE) network, a 3G data network, or the Internet. The network device 24 may be a Wi-Fi device, a radio frequency device, a Bluetooth® device, a cellular communication device, or the like.

The power source 26 of the device 10 may include the capability to power the device 10 in both non-portable and portable settings. For example, in a portable setting, the device 10 may include one or more batteries, such as a Li-Ion battery, for powering the device 10. The battery may be recharged by connecting the device 10 to an external power source, such as to an electrical wall outlet. In a non-portable setting, the power source 26 may include a power supply unit (PSU) configured to draw power from an electrical wall outlet, and to distribute the power to various components of a non-portable electronic device, such as a desktop computing system.

The display 28 may be used to display various images generated by device 10, such as a GUI for an operating system, or image data (including still images and video data) processed by the image signal processor 32, as will be discussed further below. As mentioned above, the image data may include image data acquired using the imaging device 30 or image data retrieved from the memory 18 and/or non-volatile storage 20. The display 28 may be any suitable type of display, such as a liquid crystal display (LCD), plasma display, or an organic light emitting diode (OLED) display, for example. Additionally, as discussed above, the display 28 may be provided in conjunction with the above-discussed touch-sensitive mechanism (e.g., a touch screen) that may function as part of a control interface for the electronic device 10.

The illustrated imaging device(s) 30 may be provided as a digital camera configured to acquire both still images and moving images (e.g., video). The camera 30 may include a lens and one or more image sensors configured to capturing and converting light into electrical signals. By way of example, the image sensor may include a CMOS image sensor (e.g., a CMOS active-pixel sensor (APS)) or a CCD (charge-coupled device) sensor. Generally, the image sensor in the camera 30 includes an integrated circuit having an array of pixels, wherein each pixel includes a photodetector for sensing light. As those skilled in the art will appreciate, the photodetectors in the imaging pixels generally detect the intensity of light captured via the camera lenses. However, photodetectors, by themselves, are generally unable to detect the wavelength of the captured light and, thus, are unable to determine color information.

Accordingly, the image sensor may further include a color filter array (CFA) that may overlay or be disposed over the pixel array of the image sensor to capture color information. The color filter array may include an array of small color filters, each of which may overlap a respective pixel of the image sensor and filter the captured light by wavelength. Thus, when used in conjunction, the color filter array and the photodetectors may provide both wavelength and intensity information with regard to light captured through the camera, which may be representative of a captured image.

Figure 2:
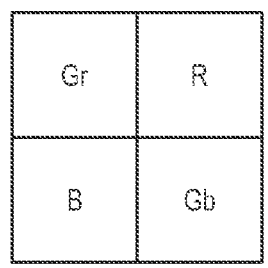
FIG. 2 shows a graphical representation of a 2×2 pixel block of a Bayer color filter array that may be implemented in the imaging device of FIG. 1.

In one embodiment, the color filter array may include a Bayer color filter array, which provides a filter pattern that is 50% green elements, 25% red elements, and 25% blue elements. For instance, FIG. 2 shows a 2×2 pixel block of a Bayer CFA includes two green elements (Gr and Gb), one red element (R), and one blue element (B). Thus, an image sensor that utilizes a Bayer color filter array may provide information regarding the intensity of the light received by the camera 30 at the green, red, and blue wavelengths, whereby each image pixel records only one of the three colors (RGB). This information, which may be referred to as "raw image data" or data in the "raw domain," may then be processed using one or more demosaicing techniques to convert the raw image data into a full color image, generally by interpolating a set of red, green, and blue values for each pixel. Such demosaicing techniques may be performed by the image signal processor 32.

Before continuing, it should be noted that while various embodiments of the various image processing techniques discussed below may utilize a Bayer CFA, the presently disclosed techniques are not intended to be limited in this regard. Indeed, those skilled in the art will appreciate that the image processing techniques provided herein may be applicable to any suitable type of color filter array, including RGBW filters, CYGM filters, and so forth.

Figure 3:
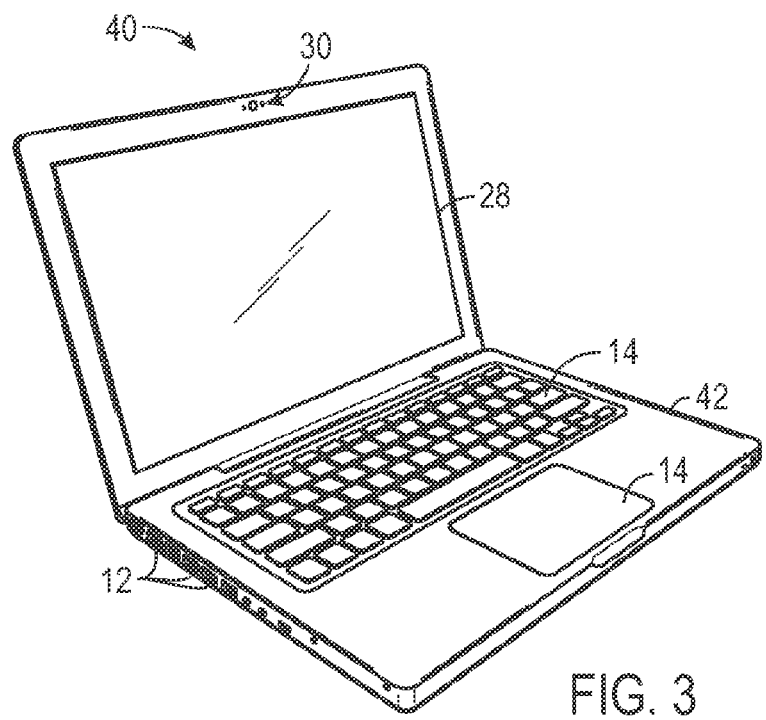
FIG. 3 is a perspective view of the electronic device of FIG. 1 in the form of a laptop computing device, in accordance with aspects of the present disclosure.
Figure 4:
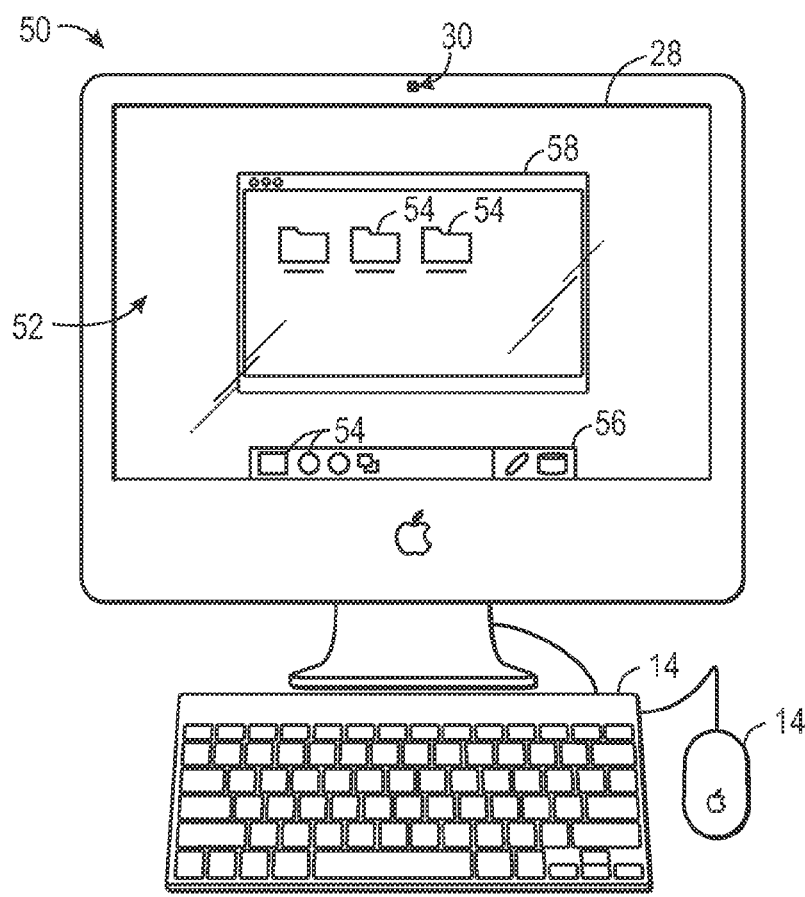
FIG. 4 is a front view of the electronic device of FIG. 1 in the form of a desktop computing device, in accordance with aspects of the present disclosure.
Figure 5:
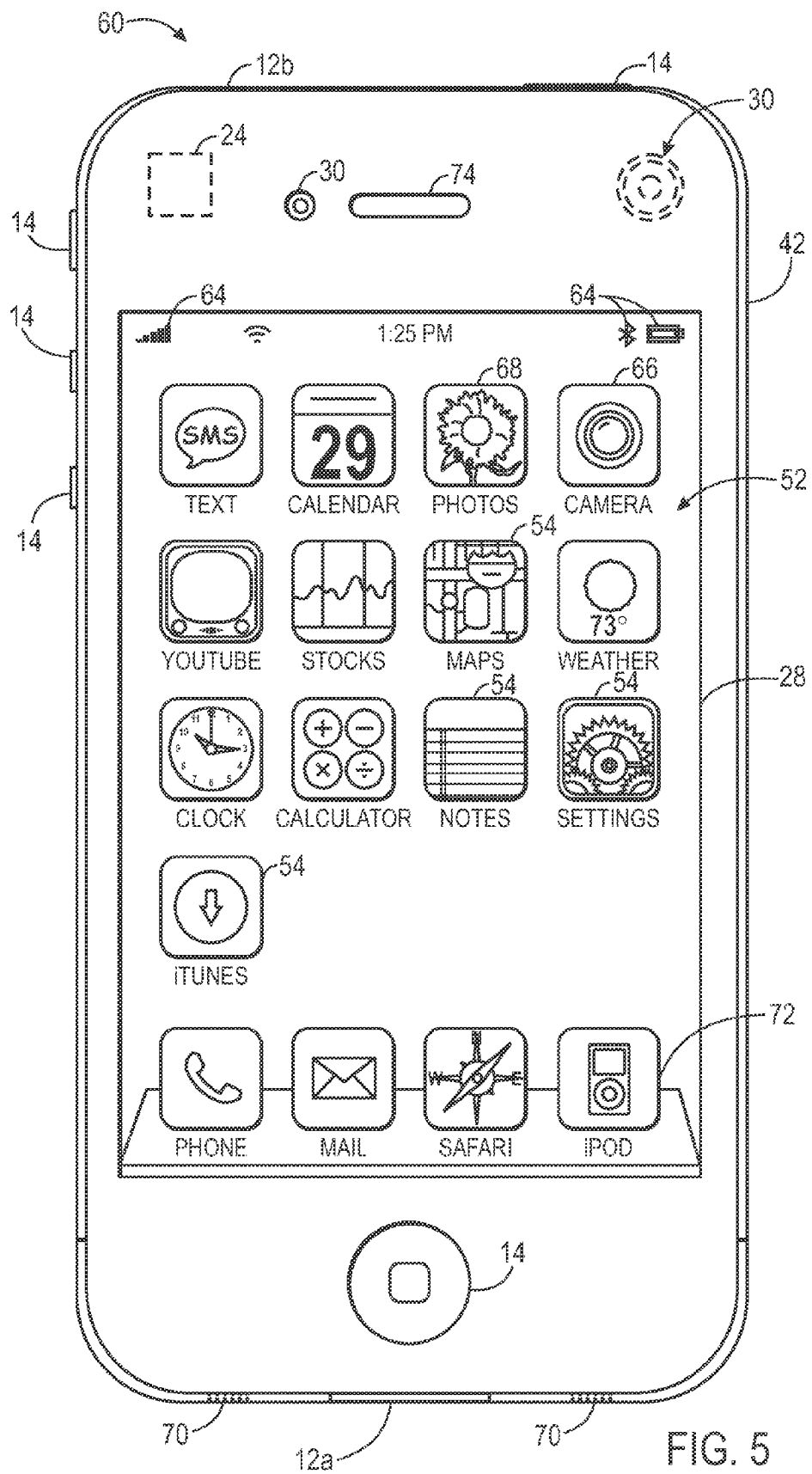
FIG. 5 is a front view of the electronic device of FIG. 1 in the form of a handheld portable electronic device, in accordance with aspects of the present disclosure.
Figure 6:
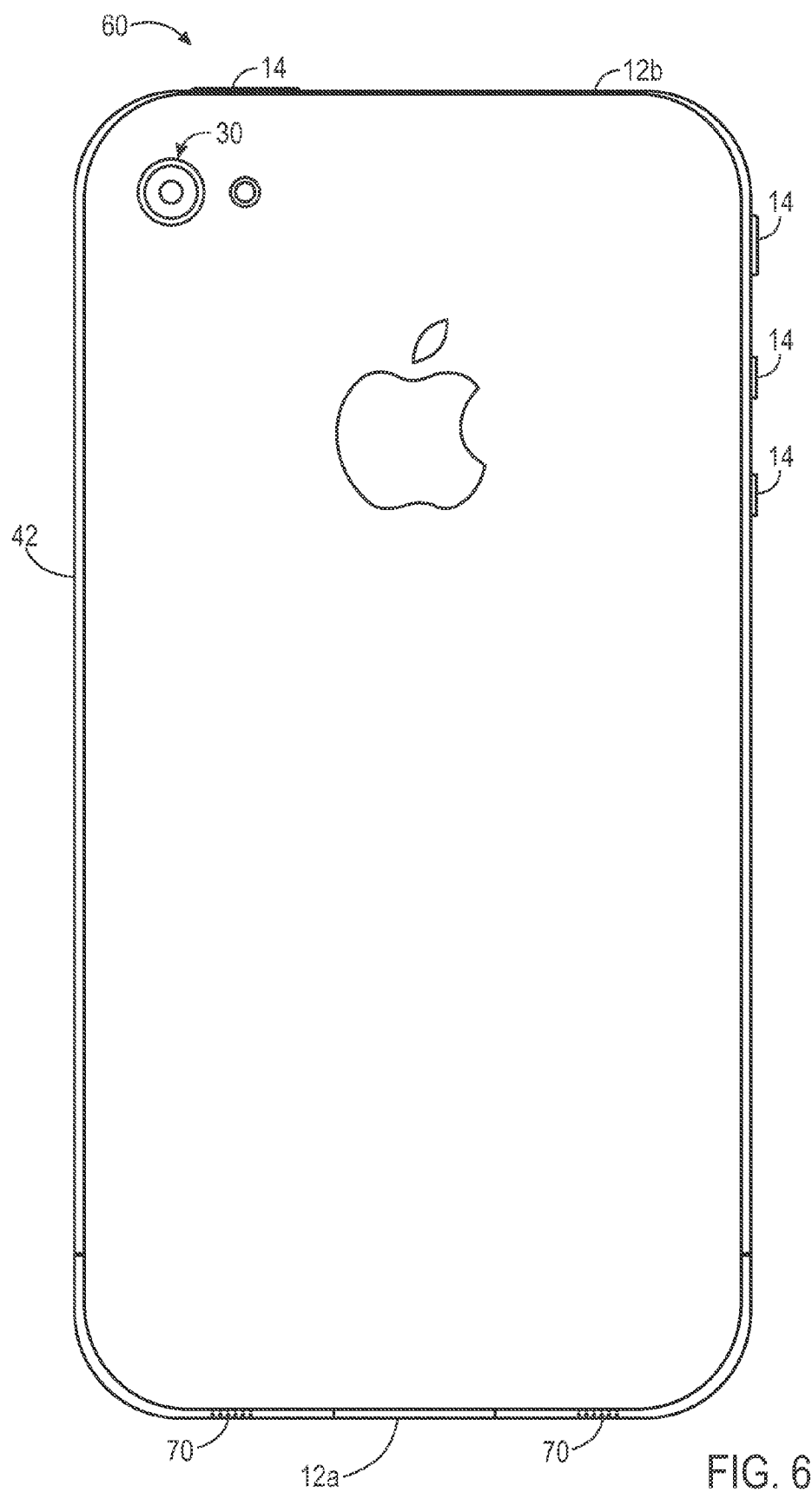
FIG. 6 is a rear view of the electronic device shown in FIG. 5.

Referring again to the electronic device 10, FIGS. 3-6 illustrate various forms that the electronic device 10 may take. As mentioned above, the electronic device 10 may take the form of a computer, including computers that are generally portable (such as laptop, notebook, and tablet computers) as well as computers that are generally non-portable (such as desktop computers, workstations and/or servers), or other type of electronic device, such as handheld portable electronic devices (e.g., digital media player or mobile phone). In particular, FIGS. 3 and 4 depict the electronic device 10 in the form of a laptop computer 40 and a desktop computer 50, respectively. FIGS. 5 and 6 show front and rear views, respectively, of the electronic device 10 in the form of a handheld portable device 60.

As shown in FIG. 3, the depicted laptop computer 40 includes a housing 42, the display 28, the I/O ports 12, and the input structures 14. The input structures 14 may include a keyboard and a touchpad mouse that are integrated with the housing 42. Additionally, the input structure 14 may include various other buttons and/or switches which may be used to interact with the computer 40, such as to power on or start the computer, to operate a GUI or an application running on the computer 40, as well as adjust various other aspects relating to operation of the computer 40 (e.g., sound volume, display brightness, etc.). The computer 40 may also include various I/O ports 12 that provide for connectivity to additional devices, as discussed above, such as a FireWire® or USB port, a high definition multimedia interface (HDMI) port, or any other type of port that is suitable for connecting to an external device. Additionally, the computer 40 may include network connectivity (e.g., network device 26), memory (e.g., memory 20), and storage capabilities (e.g., storage device 22), as described above with respect to FIG. 1.

Further, the laptop computer 40, in the illustrated embodiment, may include an integrated imaging device 30 (e.g., camera). In other embodiments, the laptop computer 40 may utilize an external camera (e.g., an external USB camera or a "webcam") connected to one or more of the I/O ports 12 instead of or in addition to the integrated camera 30. For instance, an external camera may be an iSight® camera available from Apple Inc. The camera 30, whether integrated or external, may provide for the capture and recording of images. Such images may then be viewed by a user using an image viewing application, or may be utilized by other applications, including video-conferencing applications, such as iChat®, and image editing/viewing applications, such as Photo Booth®, Aperture®, iPhoto®, or Preview®, which are available from Apple Inc. In certain embodiments, the depicted laptop computer 40 may be a model of a MacBook®, MacBook® Pro, MacBook Air®, or PowerBook® available from Apple Inc. Additionally, the computer 40, in one embodiment, may be a portable tablet computing device, such as a model of an iPad® tablet computer, also available from Apple Inc.

FIG. 4 further illustrates an embodiment in which the electronic device 10 is provided as a desktop computer 50. As will be appreciated, the desktop computer 50 may include a number of features that may be generally similar to those provided by the laptop computer 40 shown in FIG. 4, but may have a generally larger overall form factor. As shown, the desktop computer 50 may be housed in an enclosure 42 that includes the display 28, as well as various other components discussed above with regard to the block diagram shown in FIG. 1. Further, the desktop computer 50 may include an external keyboard and mouse (input structures 14) that may be coupled to the computer 50 via one or more I/O ports 12 (e.g., USB) or may communicate with the computer 50 wirelessly (e.g., RF, Bluetooth, etc.). The desktop computer 50 also includes an imaging device 30, which may be an integrated or external camera, as discussed above. In certain embodiments, the depicted desktop computer 50 may be a model of an iMac®, Mac® mini, or Mac Pro®, available from Apple Inc.

As further shown, the display 28 may be configured to generate various images that may be viewed by a user. For example, during operation of the computer 50, the display 28 may display a graphical user interface ("GUI") 52 that allows the user to interact with an operating system and/or application running on the computer 50. The GUI 52 may include various layers, windows, screens, templates, or other graphical elements that may be displayed in all, or a portion, of the display device 28. For instance, in the depicted embodiment, an operating system GUI 52 may include various graphical icons 54, each of which may correspond to various applications that may be opened or executed upon detecting a user selection (e.g., via keyboard/mouse or touchscreen input). The icons 54 may be displayed in a dock 56 or within one or more graphical window elements 58 displayed on the screen. In some embodiments, the selection of an icon 54 may lead to a hierarchical navigation process, such that selection of an icon 54 leads to a screen or opens another graphical window that includes one or more additional icons or other GUI elements. By way of example, the operating system GUI 52 displayed in FIG. 4 may be from a version of the Mac OS® operating system, available from Apple Inc.

Continuing to FIGS. 5 and 6, the electronic device 10 is further illustrated in the form of portable handheld electronic device 60, which may be a model of an iPod® or iPhone® available from Apple Inc. In the depicted embodiment, the handheld device 60 includes an enclosure 42, which may function to protect the interior components from physical damage and to shield them from electromagnetic interference. The enclosure 42 may be formed from any suitable material or combination of materials, such as plastic, metal, or a composite material, and may allow certain frequencies of electromagnetic radiation, such as wireless networking signals, to pass through to wireless communication circuitry (e.g., network device 24), which may be disposed within the enclosure 42, as shown in FIG. 5.

The enclosure 42 also includes various user input structures 14 through which a user may interface with the handheld device 60. For instance, each input structure 14 may be configured to control one or more respective device functions when pressed or actuated. By way of example, one or more of the input structures 14 may be configured to invoke a "home" screen 42 or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that the handheld device 60 may include any number of suitable user input structures existing in various forms including buttons, switches, keys, knobs, scroll wheels, and so forth.

As shown in FIG. 5, the handheld device 60 may include various I/O ports 12. For instance, the depicted I/O ports 12 may include a proprietary connection port 12a for transmitting and receiving data files or for charging a power source 26 and an audio connection port 12b for connecting the device 60 to an audio output device (e.g., headphones or speakers).

The display device 28, which may be an LCD, OLED, or any suitable type of display, may display various images generated by the handheld device 60. For example, the display 28 may display various system indicators 64 providing feedback to a user with regard to one or more states of handheld device 60, such as power status, signal strength, external device connections, and so forth. The display may also display a GUI 52 that allows a user to interact with the device 60, as discussed above with reference to FIG. 4. The GUI 52 may include graphical elements, such as the icons 54, which may correspond to various applications that may be opened or executed upon detecting a user selection of a respective icon 54. By way of example, one of the icons 54 may represent a camera application 66 that may be used in conjunction with a camera 30 for acquiring images. Referring briefly to FIG. 6, a rear view of the handheld electronic device 60 depicted in FIG. 5 is illustrated, which shows the camera 30 as being integrated with the housing 42 and positioned on the rear of the handheld device 60.

As mentioned above, image data acquired using the camera 30 may be processed using the image signal processor 32, which my include hardware (e.g., disposed within the enclosure 42) and/or software stored on one or more storage devices (e.g., memory 18 or non-volatile storage 20) of the device 60. Images acquired using the camera application 66 and the camera 30 may be stored on the device 60 (e.g., in storage device 20) and may be viewed at a later time using a photo viewing application 68.

The handheld device 60 may also include various audio input and output elements. For example, the audio input/output elements, depicted generally by reference numeral 70, may include an input receiver, such as one or more microphones. For instance, where the handheld device 60 includes cell phone functionality, the input receivers may be configured to receive user audio input, such as a user's voice. Additionally, the audio input/output elements 70 may include one or more output transmitters. Such output transmitters may include one or more speakers, which may function to transmit audio signals to a user, such as during the playback of music data using a media player application 72. Further, in embodiments where the handheld device 60 includes a cell phone application, an additional audio output transmitter 74 may be provided, as shown in FIG. 5. Like the output transmitters of the audio input/output elements 70, the output transmitter 74 may also include one or more speakers configured to transmit audio signals to a user, such as voice data received during a telephone call. Thus, the audio input/output elements 70 and 74 may operate in conjunction to function as the audio receiving and transmitting elements of a telephone.

Having now provided some context with regard to various forms that the electronic device 10 may take, the present discussion will now focus on the imaging device 30 and the image signal processor 32 depicted in FIG. 1. As mentioned above, logic carried out by the imaging device 30 and the image signal processor 32 may be implemented using hardware and/or software components, some of which may include various processing units that define an image signal processing (ISP) pipeline. In particular, the following discussion may focus on aspects of the image processing techniques set forth in the present disclosure, particularly those relating to transferring image data from the imaging device 30 to the image signal processor 32.

Image Data Transfer System

Figure 7:
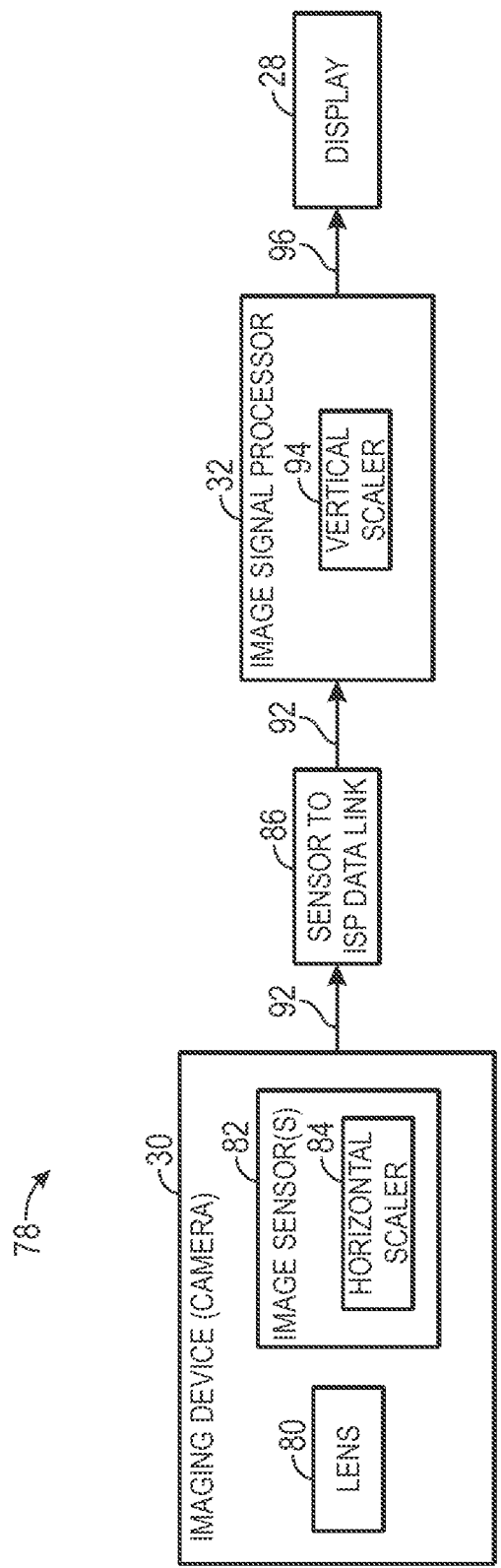
FIG. 7 is a block diagram illustrating an embodiment of the image processing circuitry of FIG. 1, in accordance with aspects of the present disclosure.

Referring now to FIG. 7, a simplified top-level block diagram 78 depicting several functional components that may be implemented as part of the imaging device 30 and the image signal processor 32 are illustrated, in accordance with one embodiment of the presently disclosed techniques. Particularly, FIG. 7 is intended to illustrate how image data may be transferred from the imaging device 30 to the image signal processor 32, in accordance with at least one embodiment. In order to provide a general overview, a general description of how these functional components operate to transfer image data is provided here with reference to FIG. 7, while a more specific description of the image sensor 82 will be further provided below.

Referring to the illustrated embodiment, the imaging device 30 may include a camera having one or more lenses 80 and image sensor(s) 82. In one embodiment, the image sensor(s) 82 may include a horizontal scaler 84 that may process raw image data acquired by the image sensor(s) 82. As discussed above, the image sensor(s) 82 may include a color filter array (e.g., a Bayer filter) and may thus provide both light intensity and wavelength information captured by each imaging pixel of the image sensors 82. The light intensity and wavelength information may be packaged together as raw image data, which may be sent to the image signal processor 32 for processing via a sensor-to-image signal processor (ISP) data link 86.

After processing the raw image data, the image signal processor 32 may send the processed image data to the display 28. For smaller amounts of image data, the image signal processor 32 and the sensor-to-ISP data link 86 may have sufficient processing resources to process the raw image data such that the display 28 may receive and display the image(s) depicted in the image data. However, for larger amounts of image data (e.g., high-resolution images or video data), the image signal processor 32 and the sensor-to-ISP data link 86 may need to process the raw image data at a very high rate in order for the display 28 to display the image(s) depicted in the raw image data effectively. As discussed above, to process a large amount of raw image data, the image sensor 82 may reduce the resolution of the raw image data and send the lower resolution or modified image data to the image signal processor 32 via the sensor-to-ISP data link 86.

Instead of binning the raw image data, the image sensor 82 may horizontally downscale the raw image data such that the sensor-to-ISP data link 86 and the image signal processor 32 may be capable of processing the raw image data at their standard rates. In this case, the image sensor 82 may use a horizontal scaler 84 to downscale or down-sample the raw image data horizontally and generate anamorphic image data 92. The horizontal scaler 84 may then send the anamorphic image data 92 to the image signal processor 32 for processing via the sensor-to-ISP data link 86. In this manner, the anamorphic image data 92 consumes half as much bandwidth on the sensor-to-ISP data link 86 as compared to the raw image data.

Since the anamorphic image data 92 has been scaled in just one direction (i.e., horizontal), the anamorphic image data 92 may include more image information or detail as compared to binned image data, which would have been scaled with respect to two directions (i.e., horizontal and vertical). After receiving the anamorphic image data 92, the image signal processor 32 may process the anamorphic image data 92 by performing one or more image processing operations, such as temporal filtering and the like. The processed anamorphic image data may then be input into a vertical scaler 94, or may be sent to a memory. The vertical scaler 94 may vertically downscale or down-sample the processed anamorphic image data and generate final resolution image data 96 that may be displayed on the display 28.

In some ways, horizontally scaling the raw image data before sending the data to the image signal processor 32 is similar to binning the raw image data in that it attempts to reduce the image resolution of the raw image data before transmission. However, since the horizontal and vertical scaling operations are divided between the image sensor 82 and the image signal processor 32, as opposed to being performed solely on the image sensor 82 (e.g., binning), the image sensor 82 and the image signal processor 32 may be used more efficiently to display a higher quality image(s) as compared to binning.

Indeed, in order to produce a high-quality downscaled image data, the horizontal scaler 84 may use one or more resampling filters that have a large number of 'taps' or delays. Taps used in resampling filters indicate locations within an array of pixels of the raw image data where respective pixel data may be stored for scaling operations. The resampling filters may generate the downscaled image data by using a filtering function that produces one output pixel based on a range of nearby input pixels. In one embodiment, a high-quality filter may use many taps to store information on many input pixels (e.g., 12) and produce one output pixel. In contrast, a low-quality filter may use a small number of taps to store information on a small number of input pixels and produce one output pixel. The resulting image from the low-quality filter may include aliasing artifacts or excessive blurring. In any case, because each output pixel depends on a number of nearby input pixels, each individual input pixel is used as input to a filter for multiple output pixels. As such, image data for each individual input pixel may be retained, or stored, by the filter until all output pixels it depends on have been processed.

Since the image sensor 82 scans out pixels horizontally, a horizontal resampling filter does not require a large amount of internal storage to retain image data for a range of horizontally-adjacent pixels that may be used by the horizontal resampling filter. Instead, the horizontal resampling filter may latch image data for a small number of pixels in simple register storage elements. A vertical resampling filter, however, may use vertically-adjacent pixels to produce an output pixel. Vertically-adjacent pixels are separated in time by an entire image scan line. As such, the vertical resampling filter may retain image data for an entire row of image pixels for each of the vertically-adjacent pixels to perform its filtering function. Thus, a vertical resampling filter may use a significant additional amount of memory as compared to a horizontal resampling filter.

Further, since an efficient vertical resampling filter would use many taps (e.g., 12 or more) to resample the image data, a relatively large amount of memory may be used to apply an efficient vertical resampling filter to the raw image data. The image sensor 82, however, may not have a sufficient amount of memory to employ an efficient vertical resampling filter. For instance, the image sensor 82 may include an on-sensor RAM array that may be sufficient to latch image data for a small number pixels in simple register storage elements (i.e., for horizontal resampling filter). However, the on-sensor RAM array may not be sufficient to employ an efficient vertical resampling filter because the silicon process that the image sensor 82 may use may not be conducive to having a large amount of memory (e.g., efficient large RAM arrays). Instead, the area on the image sensor 82 required a large amount of memory would be significant and would reduce the area available for implementing more sensor pixels. Thus, the image sensor 82 may perform horizontal scaling—but leave vertical scaling to the image signal processor 32. Namely, the image sensor 82 may use the horizontal scaler 84 to horizontally downscale the raw image data (i.e., anamorphic image data 92) before sending it to the sensor-to-ISP data link 86 and the image signal processor 32. Additional details with regard to the horizontal scaler 84 are provided below with reference to FIG. 8 and FIG. 9.

After receiving the anamorphic image data 92, the image signal processor 32 may process the anamorphic image data 92 and forward the processed anamorphic image data to a vertical scaler 94. The vertical scaler 94 may apply the vertical resampling filter to the processed anamorphic image data to generate a final output image data 96, which may be displayed on the display 28. Although applying the vertical resampling filter may involve a relatively large amount of memory as compared to applying the horizontal resampling filter, the image signal processor 32 may already include a sufficient amount of memory to apply the vertical resampling filter with an adequate amount of vertical taps to generate a high quality image(s).

Figure 8:
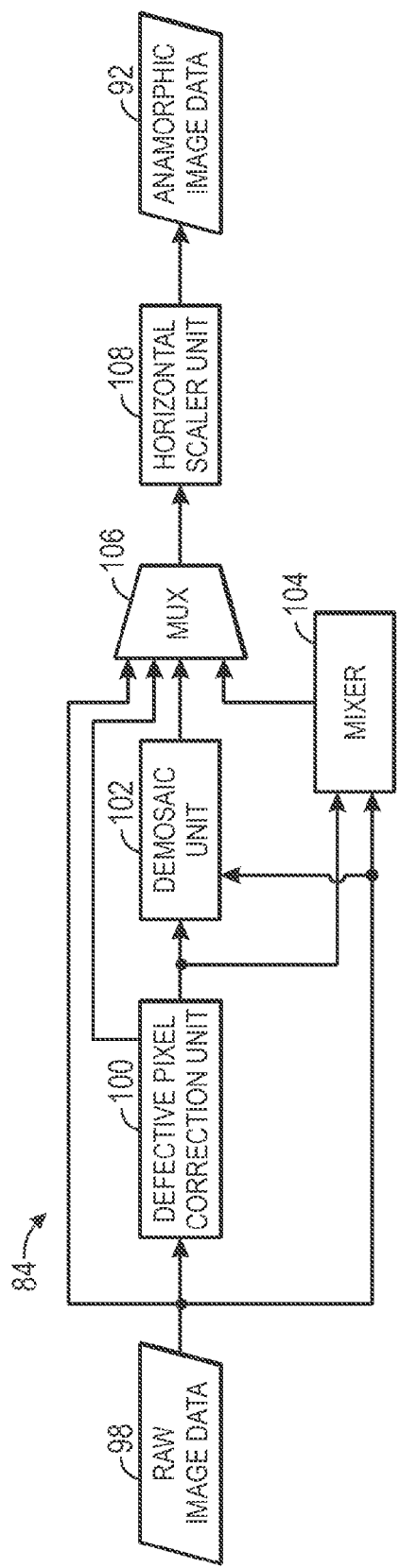
FIG. 8 is a block diagram illustrating an embodiment of a horizontal scaler in an image sensor of FIG. 7, in accordance with aspects of the present disclosure.

In addition to horizontally downscaling the raw image data, the horizontal scaler 84 may identify and correct for defective pixels in the raw image data and may preprocess the raw image data to improve the image quality of horizontally downscaled image data (i.e., anamorphic image data 92). FIG. 8 illustrates a block diagram of components in the horizontal scaler 84 that may be used to perform these operations. For instance, in one embodiment, the horizontal scaler 84 may receive raw image data 98 and process it using a defective pixel correction unit 100, a demosaic unit 102, a mixer 104, a multiplexer 106, and a horizontal scaler unit 108. As illustrated in FIG. 8, the raw image data 98 may be processed by the defective pixel correction unit 100 and the demosaic unit 102 before being horizontally downscaled by the horizontal scaler unit 108. However, it should be noted that in some embodiments, the horizontal scaler 84 may not include the defective pixel correction unit 100, the demosaic unit 102, or both. As such, correcting for defective pixels in the raw image data or demosaicing the raw image data may be optional processing steps for the horizontal scaler 84. Additional details with regard to the processing steps performed by the horizontal scaler 84 including the defective pixel correction unit 100, the demosaic unit 102, the mixer 104, the multiplexer 106, and the horizontal scaler unit 108 are described below with reference to FIG. 9.

Horizontal Scaler Unit

Figure 9:
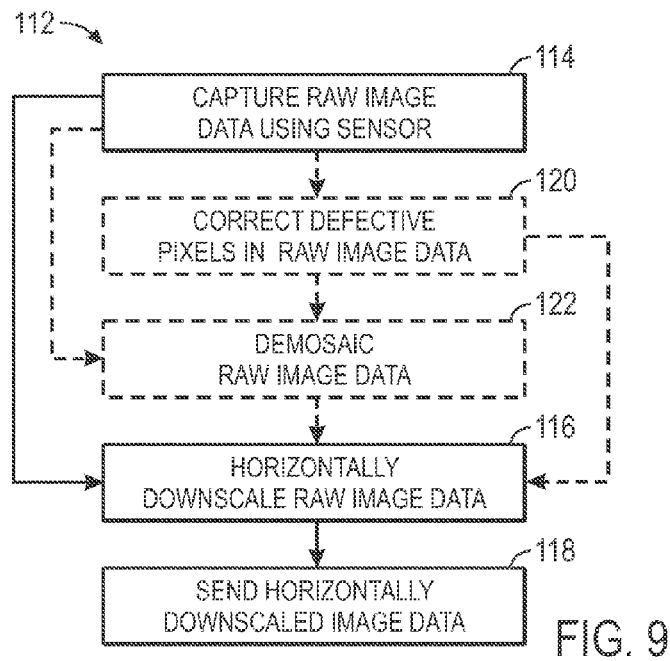
FIG. 9 is a flow diagram illustrating a method for transferring image data to an image signal processor, in accordance with aspects of the present disclosure.

FIG. 9 illustrates a flow chart of a method 112 for transferring image data from the image sensor 82 to the image signal processor 32. Although the method 112 indicates a particular order of operation, it should be understood that the method 112 is not limited to the illustrated order. Instead, the method 112 may be performed in any suitable order. In one embodiment, the method 112 may be performed by the image sensor 82 and, in particular, by the horizontal scaler 84.

At block 114, the image sensor 82 may capture raw image data. As mentioned above, the image sensor 82 may include a color filter array, which may provide both light intensity and wavelength information captured by each imaging pixel of the image sensor 82. As such, the raw image data may include a set of data that includes both light intensity and wavelength information for each imaging pixel of the image sensor 82. In one embodiment, the raw image data may correspond to Bayer color filter array data. As such, each scan line (i.e., row of pixels) in the raw image data may include either green and red pixel values or green and blue pixel values.

At block 116, the horizontal scaler 84 may use the horizontal scaler unit 108 to horizontally downscale the raw image data. The horizontal scaler unit 108 may perform the horizontal downscaling operation in a raw Bayer domain. As such, the horizontal scaler unit 108 may horizontally downscale the raw image data using pixel values of both colors in each scan line of the raw image data.

In one embodiment, the horizontal scaler unit 108 may horizontally downscale the raw image data using a horizontal resampling filter, such as a multi-tap polyphase filter. The multi-tap polyphase filter may multiply each pixel value in the raw image data by a weighting (or coefficient) factor (could be negative). The multi-tap polyphase filter may then sum the weighted horizontally adjacent pixels together to form a pixel value for a respective pixel. The pixels that correspond to the weighted horizontally adjacent pixels may depend on the position of the respective pixel and the number of taps used in the horizontal resampling filter. The weighting factors may be stored in a table and may be determined based on a current between-pixel fractional position.

The weighting factors may be determined using one of a number well-known filter design techniques to produce a low-pass (i.e., antialiasing) digital filter. In one embodiment, the low-pass digital filter may be a finite-impulse response filter such that its coefficients may be generated by applying a windowing function to an ideal low-pass filter function (e.g., a sinc function). The low-pass filter may remove high-frequency components that may produce aliases in output images from the image data.

In another embodiment, the horizontal resampling filter may be a horizontal low-pass filter on both color streams of a respective row of pixels in the raw image data. The horizontal low-pass filter may be a ½ pass zero-phase filter suitable for performing a 2:1 downscale of the raw image data. The ½ pass filter may preserve high-frequency information between the two color streams of the respective row of pixels in the raw image data, which may then be recovered by the image signal processor 32.

When horizontally downscaling the raw image, the horizontal scaler unit 108 may use a Digital Differential Analyzer (DDA) to control the current position of a respective pixel during the scaling operation all of the raw image data. As such, the horizontal scaling operation performed by the horizontal scaler unit 108 may include: (1) initializing the DDA; (2) performing a multi-tap polyphase filtering of the raw image data using an integer and fractional portions of the DDA; (3) adding a step value to the DDA; and repeating elements (2) and (3) for each pixel in the raw image data.

The multi-tap polyphase filtering process of element (2) may include acquiring source pixel values of the pixels surrounding a respective pixel and multiplying the source pixel values by the appropriate weights or coefficients. In one embodiment, the horizontal resampling filter may have 15 taps. Here, the 15-tap filter may horizontally downscale the raw image data using a center pixel value (i.e., respective pixel) and seven additional pixel values on either side of the center pixel (e.g., $-7, -6, -5, -4, -3, -2, -1, 0, +1, +2, +3, +4, +5, +6, +7$).

After the raw image data is horizontally downscaled, the horizontal scaler unit 108 may output pixels in the same Bayer order as the input pixels as the anamorphic image data 92. At block 118, the horizontal scaler unit 108 may send the anamorphic image data 92 to the image signal processor 32 via the sensor-to-ISP data link 86.

Defective Pixel Correction Unit

As discussed above, in addition to horizontally downscaling the raw image data, the horizontal scaler 84 may identify and correct for defective pixels in the raw image data as will be described below with respect to block 120 in the method 112. It should be noted, however, that the horizontal scaler 84 may not necessarily correct for defective pixels in the raw image data as described with respect to block 120. In other words, the raw image data could instead be horizontally downscaled without correcting the defective pixels.

When the horizontal scaler 84 performs defective pixel correction, the image sensor 82 may use the defective pixel correction unit 100 in the horizontal scaler 84 to apply one-dimensional defective pixel correction to the raw image data at block 120. The one-dimensional defective pixel correction may identify defective pixels in the raw image data based on pixels located in the same scan line as a respective pixel. In one embodiment, the defective pixel correction unit 100 may employ method 130, illustrated as a flow chart in FIG. 10, to detect and correct defective pixels in the raw image data.

Figure 10:
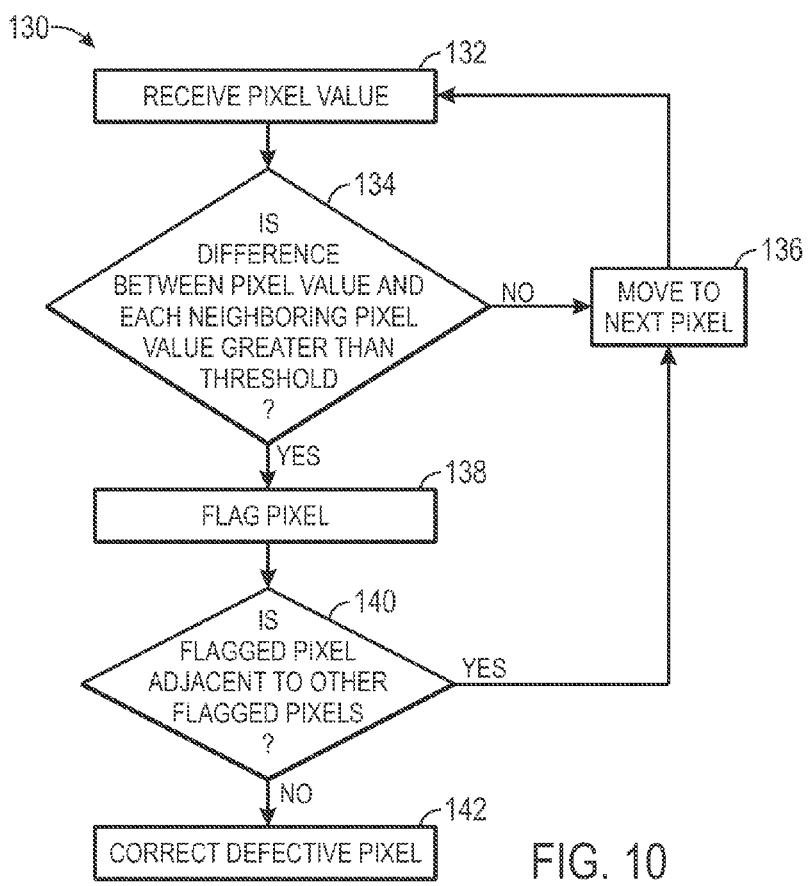
FIG. 10 is a flow diagram illustrating a method for correcting defective pixels in image data, in accordance with aspects of the present disclosure.

As seen in FIG. 10, the defective pixel correction unit 100 may receive a pixel value for a respective pixel in the raw image data at block 132. At block 134, the defective pixel correction unit 100 may determine whether a difference between the received pixel value and each of its horizontally adjacent neighboring pixel values is greater than a threshold value. If the difference is not greater than the threshold value, the defective pixel correction unit 100 may move to the next pixel in the raw image data (decision block 136) and receive the next pixel value (block 132). If, however, the difference is greater than the threshold value (decision block 136), the defective pixel correction unit 100 may flag the respective pixel as a possible defective pixel (block 138). The defective pixel correction unit 100 may then save the location of the flagged pixel in a buffer (e.g., one bit per pixel). For pixels at the edge of the raw image data, the defective pixel correction unit 100 may extend the image by at least four pixels by replicating two edge pixels.

In one embodiment, the threshold value may be selected to maximize a number of correctly-detected defective pixels while minimizing the number of incorrectly detected pixels using a statistical analysis of sample images. In certain embodiments, the threshold may not be constant. Instead, it may vary based the scene content (e.g., exposure, etc.) of the image data.

At block 140, the defective pixel correction unit 100 may determine whether the flagged pixel's immediate horizontally, vertically, or diagonally adjacent neighboring pixels were previously flagged as possible defective pixels. Since the image sensor 82 outputs the raw image data in a horizontal line-by-line basis, the defective pixel correction unit 100 may only have data regarding whether five immediate neighboring pixels located one pixel away (i.e., to the left, right, up-left, above, and up-right of the respective pixel) have been flagged in the manner of block 138. For pixels on the first row of the raw image data, the defective pixel correction unit 100 may assume that the first row of pixels has a virtual row of pixels located above it such that none of the previous row's pixels has been flagged. If the defective pixel correction unit 100 determines that any of the five immediate neighboring pixels have been flagged, then the defective pixel correction unit 100 may move to the next pixel in the raw image data (block 136).

Alternatively, if the defective pixel correction unit 100 determines that none of the five immediate neighboring pixels has been flagged, the defective pixel correction unit 100 may designate the respective flagged pixel as defective. At block 142, the defective pixel correction unit 100 may then correct the defective pixel. In one embodiment, the defective pixel correction unit 100 may replace the defective pixel using a linear filter and the pixel values of the pixels neighboring the defective pixel as shown below in Equation 1.

$$Pc(i,j)=(P(i,j-3)*DPCF(comp,0)+P(i,j-1)*DPCF(comp,1)+P(i,j+1)*DPCF(comp,2)+P(i,j+3)*DPCF(comp,3)+((P(i,j-2)+P(i,j+2))<<11+2^{\wedge}11)>>12 \quad (1).$$

In Equation 1, comp refers to the Bayer component (Gr/R/B/Gb) of pixel (i,j) and functions DPCF[4][4] refer to defective pixel correction filter coefficients. The defective pixel correction filter coefficients may be signed 16-bit numbers with 12 fractional bits, and each color component may have its own set of filter coefficients. Since the raw image data may be arranged according to a Bayer color filter array, P(i,j−2) and P(i,j+2) are same color of P(i,j).

Referring briefly again to FIG. 8, in one embodiment, after correcting for the defective pixel, the defective pixel correction unit 100 may send the corrected raw image data to the horizontal scaler unit 108 via the multiplexer 106. In another embodiment, the horizontal scaler 84 may send the original pixel value for the defective pixel from the raw image data 92 and the replacement pixel value, as determined by the defective pixel correction unit 100, to the mixer 104. The mixer 104 may mix the various image data according to any suitable weighting before forwarding the mixed image data to the horizontal scaler unit 108 via the multiplexer 106, as shown in FIG. 8. As will be noted below, the defective pixel correction unit 100 may occasionally overcorrect by identifying a defective pixel where none exists. Mixing the raw image data 98 with image data output by the defective pixel correction unit 100 may allow some of the image information lost when such defective pixel overcorrection occurs to be added back into the image data. Although actual defective pixel data in the raw image data 98 will reduce the image quality, the resulting data output by the mixer 104 may be less problematic than had the defective pixel correction had not occurred at all.

Figure 11:
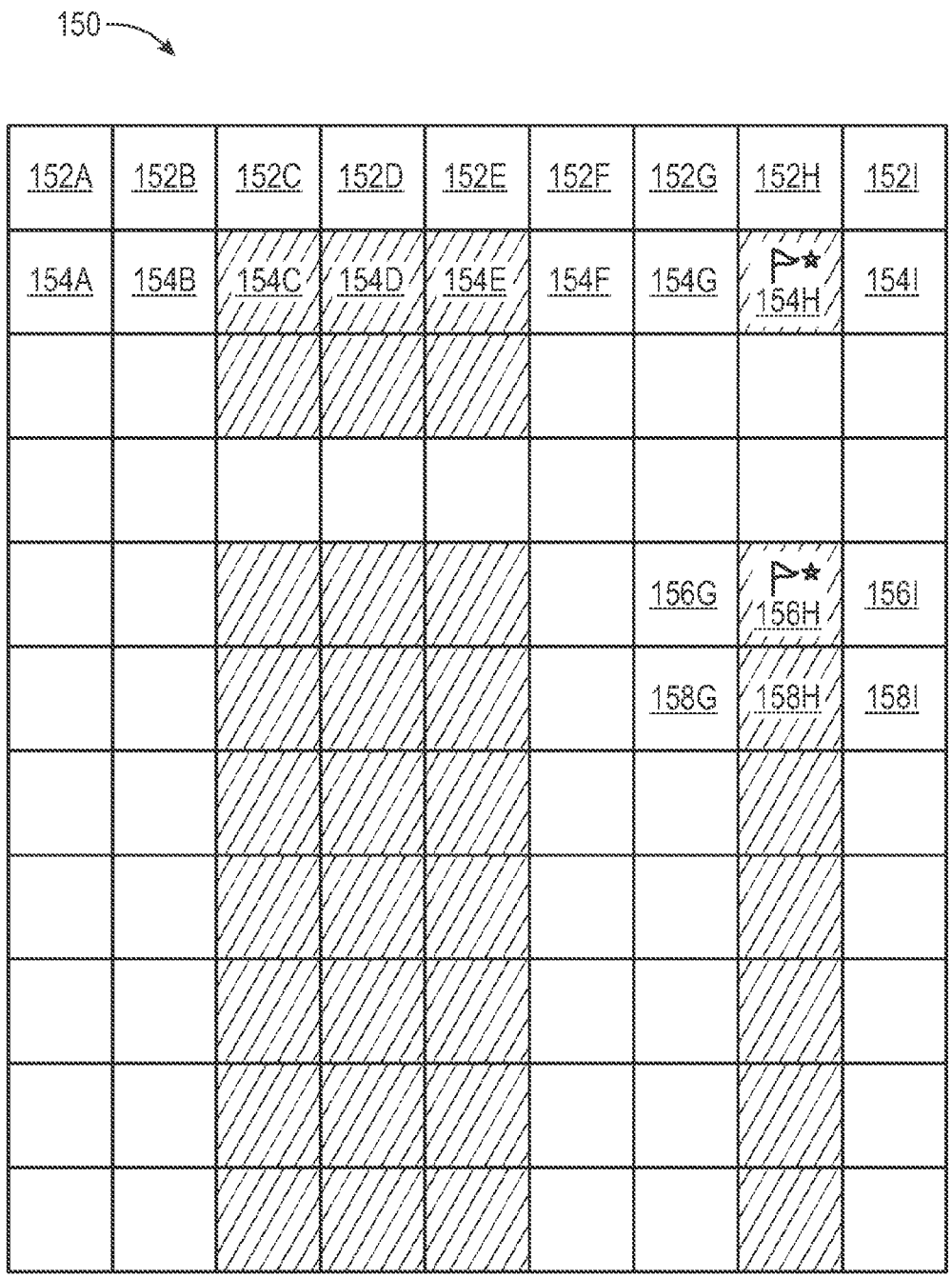
FIG. 11 is a diagram illustrating a pixel array that serves as an example for detecting defective pixels using the method described in FIG. 10, in accordance with aspects of the present disclosure.

Keeping the method 130 of one-dimensional defective pixel correction in mind, FIG. 11 provides an example of a pixel array 150 representing raw image data 98 that may be analyzed using method 130. Referring to block 132 of method 130, the defective pixel correction unit 100 may initially receive a pixel value for pixel 152A, which corresponds to the first pixel output by the image sensor 82. Since the pixel 152A is substantially similar to its neighboring pixel 152B, the difference between the pixel value for pixel 152A and pixel 152B will likely be zero, which will likely be less than the threshold value of block 134. As such, the defective pixel correction unit 100 may move to pixel 152B (block 136) and determine whether the difference between the pixel value of pixel 152B and those of its neighboring pixels is greater than the threshold value (block 134).

When the defective pixel correction unit 100 receives the pixel value for pixel 154C, the defective pixel correction unit 100 may determine that the difference between the pixel value for pixel 154B and pixel 154C may be greater than the threshold value because pixel 154B (white pixel) has a significantly different pixel value as compared to pixel 154C (black pixel). However, the difference between the pixel value for pixel 154C and its next neighboring pixel (pixel 154D) will likely be zero because both pixels are black. As such, the difference between the pixel value for pixel 154C and pixel 154D will likely be less than the threshold value. Since the difference between the pixel value for pixel 154C and both of its neighboring pixels are less than the threshold value, the defective pixel correction unit 100 may move to next pixel (block 136).

Pixel 154H represents a defective pixel. The defective pixel correction unit 100 may identify pixel 154H as a defective pixel by first determining that the difference between the pixel value for pixel 154H and pixel 154G is greater than the threshold value because pixel 154H (black pixel) has a significantly different pixel value as compared to pixel 154G (white pixel). Similarly, the defective pixel correction unit 100 may determine that the difference between the pixel value for pixel 154H and pixel 154I may be greater than the threshold value because pixel 154H (black pixel) has a significantly different pixel value as compared to pixel 154I (white pixel). Accordingly, since the difference between the pixel value for pixel 154H and each of its neighboring pixels are greater than the threshold value, the defective pixel correction unit 100 may flag pixel 154H as a possible defective pixel (block 138). The defective pixel correction 100 may then store the location of flagged pixel in a buffer for future reference.

The defective pixel correction unit 100 may determine that pixel 154H is indeed a defective pixel based on whether it is immediately adjacent to any other flagged pixels (block 140). As mentioned above, since the image sensor 82 outputs the raw image data as horizontal rows of pixels, the defective pixel correction unit 100 may only have information related to flagged pixels located one pixel away to the left, right, up-left, above, and up-right of the pixel 154H. As such, the defective pixel correction unit 100 may determine whether pixels 152G, 152H, 152I, 152G, and 154I were previously flagged according to its buffer. As shown in FIG. 11, since none of the pixels immediately adjacent to the pixel 154H were previously flagged, the defective pixel correction unit 100 may designate the pixel 154H as a defective pixel.

After identifying the defective pixel, the defective pixel correction unit 100 may correct the pixel 154H by determining a replacement pixel value for the pixel 154H by linearly filtering the neighboring pixels of pixel 154H.

Unlike pixel 154H, pixel 156H is not a defective pixel. Indeed, pixel 156H may represent a first pixel in a line of vertical pixels of similar color. Such an image may be obtained when the imaging device 30 captures an image of text on paper, which may have stark black letters against a white background. The defective pixel correction unit 100 may identify pixel 156H as a defective pixel, however, because the difference between its pixel value (i.e., black pixel) and each of its horizontally-neighboring pixels (i.e., white pixels) are greater than the threshold value and none of the pixels immediately adjacent (in the previous or same row) to 156H has been flagged as possible defective pixels. Although the defective pixel correction unit 100 may incorrectly identify pixel 156H as a defective pixel, this erroneous designation will be limited to just one pixel in a vertical line of similar distinct pixels. For instance, when the defective pixel correction unit 100 evaluates pixel 158H using method 130, the defective pixel correction unit 100 will flag pixel 158H as a possible defective pixel (block 134), but it will not designate pixel 158H as a defective pixel because the pixel immediately above it (pixel 156G) was previously flagged (block 140). Similarly, the defective pixel correction unit 100 will not identify the other pixels directly underneath pixel 156H and pixel 158H as defective pixels because each of those pixels will be flagged as possibly being defective like pixel 156H and pixel 158H. As such, since the pixel immediately above the respective pixel is flagged, as discussed above with reference to block 140 of FIG. 10, the respective pixel will not be identified as a defective pixel.

Given its limited memory resources, the image sensor 82 may not be able to employ a two-dimensional defective pixel correction process, which may be more effective than the one-dimensional defective pixel correction process employed in method 130. However, by performing some defective pixel correction process on the raw image data, the image sensor 82 may send higher quality image data to the image signal processor 32, which may yield higher quality images on the display 28.

Demosaic Unit

Referring back to the method 112, in lieu of correcting for defective pixels in the raw image data at block 120, the image sensor 182 may perform a one-dimensional demosaic operation on the raw image data (block 122) using the demosaic unit 102 shown in FIG. 8. Although the image signal processor 32 may be capable of performing demosaicing operations that may be more effective than the one-dimensional demosaic operation, by demosaicing the raw image data before horizontal downscaling, the demosaic unit 102 may enable the horizontal scaler unit 108 to retain more horizontal detail in the anamorphic image data 92 sent to the image signal processor 32. As such, the resulting image(s) displayed on the display 28 may be significantly improved as compared to a binned version of the raw image data displayed on the display 28. It should be noted, however, that alternative embodiments may not involve demosaicing the raw image data as described with respect to block 122, and the raw image data could instead be horizontally downscaled without being demosaiced.

Figure 12A:
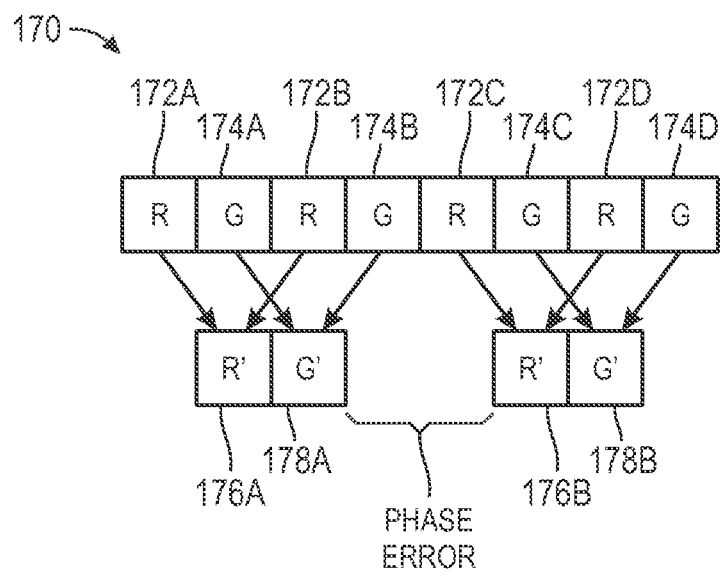
FIG. 12A is a diagram illustrating a phase error that occurs as a result of binning image data.

For illustration purposes, an example of the effects of binning the raw image data are illustrated in FIG. 12A. As shown in FIG. 12A, a row 170 of raw image data may include red pixels 172 and green pixels 174. The binned image data of the row 170 may be generated based on pixel values of similarly colored adjacent pixels. For instance, since row 170 includes red pixels interleaved with green pixels, each binned red pixel (e.g., pixel 176A and pixel 176B) may be determined based on the pixel value of adjacent red pixels (e.g., pixel 172A and pixel 172B or pixel 172C and pixel 172D). As a result, the binned image data may include red pixel 176A that may be determined based on red pixels 172A and 172B. Similarly, the binned image data may include a green pixel 178A that may be determined based on green pixels 174A and 174B. The resulting binned image data includes a sampling phase error due to the manner in which the raw image data was binned. In addition to the phase error, the resulting binned image data also loses image detail, since there is no cross-correlation between the different color channels. That is, although the raw image data may have high-frequency detail in terms of its pixel resolution, much of this resolution is lost in binning because the binning process averages pixel values from relatively distant pixels of the same color.

In one embodiment, the demosaic unit 102 may apply a one-dimensional horizontal demosaic algorithm on each scan line of the raw image data such that the resulting image data retains more horizontal detail as compared to a binned version of the raw image data. Here, the demosaic unit 102 may receive a stream of Bayer pixels from the raw image data and output a stream of 2-color pixel values. Each of the 2-color pixel values may include the original pixel value and an interpolated value for a different color component on the row.

Figure 12B:
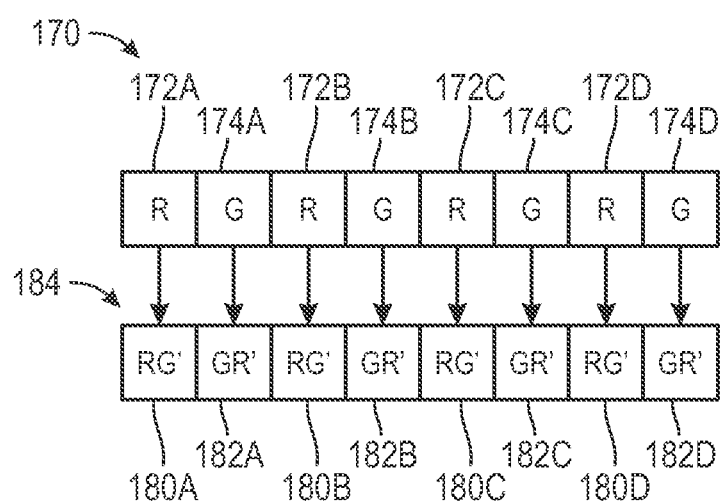
FIG. 12B is a diagram illustrating horizontally demosaiced image data, in accordance with aspects of the present disclosure.

To provide one example, FIG. 12B illustrates a row 170 of the raw image data that includes red pixels interleaved with green pixels. In contrast to binning as shown in FIG. 12A, the demosaic unit 102 may interpolate each pixel value using both red and green pixels. That is, the demosaic unit 102 may generate pixel 180A such that it includes the original red pixel value for pixel 172A and an interpolated value for green (i.e., G'). In one embodiment, the interpolation of the respective pixel's adjacent color may be performed using a horizontal linear filter. The horizontal linear filter may cross correlate the pixels that are horizontally adjacent (i.e., pixels of both colors) to the respective pixel to determine the interpolated value for the respective pixel's other color component. For pixels at the edge of the image, the demosaic unit 102 may extend the image with four pixels by replicating two edge pixels. Although the demosaic unit 102 has been described as interpolating a pixel's color using linear interpolation methods, it should be noted that in some embodiments the interpolation of the pixel's color may be performed by non-linear interpolation methods (i.e., edge-sensitive methods).

Each pixel in the resulting demosaiced image data 184 may include the original pixel value for the original pixel color and an interpolated pixel value for the respective pixel's adjacent color. The demosaic unit 108 may then send the demosaiced image data 184 to the multiplexer 106, which may forward the demosaiced image data 184 to the horizontal scaler unit 108.

Referring briefly again to FIG. 8, after the horizontal scaler unit 108 horizontally downscales the demosaiced image data 184, the resulting anamorphic image data 92 may be sent to the image signal processor 32 via the sensor-to-ISP data link 86. Upon receiving the anamorphic image data 92, the image signal processor 32 may process the anamorphic image data 92 and/or send the resulting image data to the vertical scaler 94, which may vertically downscale the image data to generate final resolution image data 96. Since the demosaiced image data 184 include information related to each pixel's original pixel value and an interpolated pixel value related to its surrounding pixel values, the final resolution image data 96 may include additional horizontal detail with regard to the original raw image as compared to a binned version of the raw image data. As such, the final resolution image data 96 may produce significantly higher quality images on the display 28 as compared to the binned version of the raw image data.

In one embodiment, the multiplexer may also receive an input from the mixer 104, which may include information related to the original raw image data and the corrected defective pixels. Moreover, although block 120 and block 122 of method 112 have been described as being performed in lieu of each other, it should be understood that the method 112 may also be performed by correcting for defective pixels in the raw image data and by demosaicing the raw image data as described in block 120 and block 122.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
   receiving image data acquired by an image sensor having a horizontal scaler;
   processing the image data using the horizontal scaler in the image sensor by:
      correcting one or more defective pixels in the image data based on a one-dimensional defective pixel correction algorithm, wherein correcting the defective pixels comprises:
         receiving a respective pixel value for a respective pixel in the image data;
         determining a difference between the respective pixel value and each pixel value of each pixel that is horizontally adjacent to the respective pixel;
         flagging the respective pixel when the difference is greater than a threshold value;
         replacing the respective pixel value with only one or two pixel values that correspond to one or two pixels that are horizontally adjacent to the respective pixel using a linear filter when the respective pixel is flagged and at least five pixels adjacent to the respective pixel are not flagged; and
   displaying the corrected image data on a display device.

2. The method of claim 1, wherein determining the difference between the respective pixel value and each pixel value of each pixel that is horizontally adjacent to the respective pixel comprises extending the image data by at least four pixels if the respective pixel is located at an edge of the image data.

3. The method of claim 2, wherein extending the image data comprises replicating at least two pixel values that correspond to at least two pixels on the edge of the image data.

4. The method of claim 1, wherein the at least five pixels comprise:
   a first pixel located left of the respective pixel;
   a second pixel located right of the respective pixel;
   a third pixel located above and left of the respective pixel;
   a fourth pixel located above the respective pixel; and
   a fifth pixel located above and right of the respective pixel.

5. The method of claim 1, wherein processing the image data using the horizontal scaler in the image sensor comprises:
   horizontally demosaicing the image data based on a one-dimensional horizontal demosaic algorithm;
   horizontally downscaling the processed image data using the horizontal scaler in the image sensor; and
   vertically downscaling the horizontally downscaled image data in an image signal processor to be displayed for viewing on a display device.

6. The method of claim 5, wherein horizontally demosaicing the image data comprises determining two color values for each pixel in the image data.

7. The method of claim 6, wherein the two color values for each pixel comprise an original color for a respective pixel and an interpolated color for a color of a pixel that is horizontally adjacent to the respective pixel.

8. The method of claim 5, wherein horizontally demosaicing the image data comprises applying a one-dimensional horizontal demosaic algorithm to one or more scan lines of the image data.

9. The method of claim 5, wherein horizontally downscaling the processed image data comprises passing the processed image data through a low-pass filter on two color streams of each row of pixels in the processed image data.

10. The method of claim 9, wherein the low-pass filter is a zero-phase half pass filter configured to perform a 2:1 downscale of the processed image data.

11. The method of claim 9, wherein the low-pass filter is configured to preserve high-frequency information between the two color streams of each row of pixels in the processed image data.

12. The method of claim 5, wherein horizontally downscaling the processed image data comprises applying a horizontal resampling filter to the processed image data.

13. The method of claim 12, wherein the horizontally resampling filter comprises a plurality of taps.

14. The method of claim 12, wherein the horizontally resampling filter is a multi-tap polyphase filter.

15. The method of claim 14, wherein the multi-tap polyphase filter has 15 taps.

16. The method of claim 12, wherein applying the horizontally resampling filter comprises:
   multiplying each pixel value in the processed image data by a respective weighting factor thereby generating one or more weighted pixel values; and
   summing one or more of the weighted pixel values of one or more pixels horizontally adjacent to a respective pixel; and
   repeating the summing step for each pixel in the processed image data.

17. The method of claim 16, wherein the respective weighting factor is determined based on a current between-pixel fractional position.

18. The method of claim 5, wherein vertically downscaling the horizontally downscaled image data comprises applying a vertical resampling filter with a plurality of vertical taps to the horizontally downscaled image data.

19. A system comprising:
   a display device for displaying one or more images;
   an image signal processor configured to send the one or more images to the display device; and
   an image sensor configured to receive image data, the image sensor comprising a horizontal scaler configured to:
      correct one or more defective pixels in the image data by:
         receiving a respective pixel value for a respective pixel in the image data;
         determining a difference between the respective pixel value and each pixel value of each pixel that is horizontally adjacent to the respective pixel;
         flagging the respective pixel when the difference is greater than a threshold value; and
         replacing the respective pixel value with only one or two pixel values that correspond to one or two pixels that are horizontally adjacent to the respective pixel using a linear filter when the respective pixel is flagged and at least five pixels adjacent to the respective pixel are not flagged;
      and
      horizontally downscale the image data, wherein the image sensor is further configured to send the horizontally downscaled image data to the image signal processor.

20. The system of claim 19, comprising a sensor-to-image signal processor data link that is configured to transport the horizontally downscaled image data from the image sensor to the image signal processor.

21. An electronic device, comprising:
   a display configured to display one or more images;
   an image signal processor configured to send the one or more images to the display; and
   an image sensor configured to receive image data, the image sensor comprising a horizontal scaler configured to:
      correct one or more defective pixels in the image data by:
         receiving a respective pixel value for a respective pixel in the image data;
         determining a difference between the respective pixel value and each pixel value of each pixel that is horizontally adjacent to the respective pixel;
         flagging the respective pixel when the difference is greater than a threshold value; and
         replacing the respective pixel value with only one or two pixel values that correspond to one or two pixels that are horizontally adjacent to the respective pixel using a linear filter when the respective pixel is flagged and at least five pixels adjacent to the respective pixel are not flagged; and
      horizontally downscale the defective pixel corrected image data.

22. The electronic device of claim 21, wherein the image sensor stores one or more locations of the defective pixels in a line buffer.

23. An imaging device, comprising:
   an image sensor comprising a horizontal scaler configured to:
      process image data by:
         correcting one or more defective pixels in the image data by:
            receiving a respective pixel value for a respective pixel in the image data;
            determining a difference between the respective pixel value and each pixel value of each pixel that is horizontally adjacent to the respective pixel;
            flagging the respective pixel when the difference is greater than a threshold value; and
            replacing the respective pixel value with only one or two pixel values that correspond to one or two pixels that are horizontally adjacent to the respective pixel using a linear filter when the respective pixel is flagged and at least five pixels adjacent to the respective pixel are not flagged;
         horizontally downscale the processed image data; and
      wherein the image sensor is configured to send the horizontally downscaled image data to an image signal processor.

24. A method comprising:
   receiving image data acquired by an image sensor having a horizontal scaler;
   processing, using the horizontal scaler, the image data by:
      correcting one or more defective pixels in the image data based on a one-dimensional defective pixel correction algorithm using the horizontal scaler by:
         receiving a respective pixel value for a respective pixel in the image data;
         determining a difference between the respective pixel value and each pixel value of each pixel that is horizontally adjacent to the respective pixel;
         flagging the respective pixel when the difference is greater than a threshold value; and
         replacing the respective pixel value with only one or two pixel values that correspond to one or two pixels that are horizontally adjacent to the respective pixel using a linear filter when the respective pixel is flagged and at least five pixels adjacent to the respective pixel are not flagged;
   horizontally downscaling the processed image data using the horizontal scaler; and
   sending, via the image sensor, the horizontally downscaled image data to an image signal processor configured to vertically downscale the processed horizontally downscaled image.

* * * * *